(12) United States Patent
Case et al.

(10) Patent No.: US 11,645,419 B2
(45) Date of Patent: May 9, 2023

(54) DYNAMIC ANONYMIZATION FOR AUTOMOTIVE SUBSCRIPTIONS

(71) Applicant: Volvo Car Corporation, Gothenburg (SE)

(72) Inventors: Douglas Robert Case, Saratoga, CA (US); Bin Wang, Belmont, CA (US)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

(21) Appl. No.: 17/347,094

(22) Filed: Jun. 14, 2021

(65) Prior Publication Data

US 2022/0398344 A1    Dec. 15, 2022

(51) Int. Cl.
*G06F 21/62* (2013.01)

(52) U.S. Cl.
CPC ............................ *G06F 21/6254* (2013.01)

(58) Field of Classification Search
CPC .................................................. G06F 21/6254
See application file for complete search history.

(56) References Cited

U.S. PATENT DOCUMENTS

| | | | | |
|---|---|---|---|---|
| 11,080,423 | B1 * | 8/2021 | Kassam-Adams | G16H 15/00 |
| 11,381,962 | B1 * | 7/2022 | Mohan | H04W 4/029 |
| 2017/0177904 | A1 | 6/2017 | Bilodeau et al. | |
| 2018/0060546 | A1 * | 3/2018 | Yin | H04L 63/08 |
| 2019/0026487 | A1 | 1/2019 | Ichida | |
| 2019/0198139 | A1 | 6/2019 | Majge et al. | |
| 2019/0205507 | A1 * | 7/2019 | Antonatos | H04L 63/1491 |
| 2019/0332807 | A1 * | 10/2019 | LaFever | G06F 21/6254 |
| 2020/0320224 | A1 * | 10/2020 | Regensburger | G06F 17/18 |
| 2021/0279366 | A1 * | 9/2021 | Choudhury | G06F 21/6245 |
| 2021/0372801 | A1 * | 12/2021 | Bennati | G01C 21/387 |
| 2022/0164478 | A1 * | 5/2022 | Fleck | G06F 21/6254 |
| 2022/0166803 | A1 * | 5/2022 | Brannon | H04L 63/102 |
| 2022/0171825 | A1 * | 6/2022 | Brannon | G06F 16/951 |
| 2022/0198034 | A1 * | 6/2022 | Rodriguez | G06F 21/78 |
| 2022/0198044 | A1 * | 6/2022 | Madhavan | G06F 16/217 |
| 2022/0198053 | A1 * | 6/2022 | Madhavan | G06F 21/6245 |
| 2022/0198054 | A1 * | 6/2022 | Picos | G06F 21/6245 |
| 2022/0198058 | A1 * | 6/2022 | VanBlon | G06F 21/36 |
| 2022/0201045 | A1 * | 6/2022 | Brannon | G06F 21/554 |
| 2022/0222373 | A1 * | 7/2022 | Villax | G06F 21/6254 |

(Continued)

OTHER PUBLICATIONS

Sartor, N. | Data Anonymization Software—Differences Between Static and Interactive Anonymization. https://aircloak.com/data-anonymisation-software-differences-between-static-and-interactive-anonymisation/, last accessed on Jun. 7, 2021.

(Continued)

*Primary Examiner* — J. Brant Murphy
*Assistant Examiner* — Stephen T Gundry
(74) *Attorney, Agent, or Firm* — Amin, Turocy & Watson, LLP

(57) ABSTRACT

A computer-implemented method can comprise determining, by a device comprising a processor, personally identifying data elements of data, representative of a group of transactions, that comprise personally identifying information according to an anonymization criterion associated with personally identifying information being determined not to be satisfied by the data elements, and storing, by the device, non-identifying data elements of the data to a non-identifying data store.

20 Claims, 11 Drawing Sheets

(56) References Cited

U.S. PATENT DOCUMENTS

2022/0239469 A1\* 7/2022 Fleck .................. H04L 63/0414
2022/0261500 A1\* 8/2022 Apsingekar ............... H04L 9/30

OTHER PUBLICATIONS

He, X. et al | Dynamic Anonymization for Marginal Publication. In: Bayard Cushing J., French J., Bowers S. (eds) Scientific and Statistical Database Management. SSDBM 2011. Lecture Notes in Computer Science, vol. 6809. Springer, Berlin, Heidelberg. https://doi.org/10.1007/978-3-642-22351-8_28.
Lomas, N. | Privacy researchers devise a noise-exploitation attack that defeats dynamic anonymity. https://techcrunch.com/2019/08/17/privacy-researchers-devise-a-noise-exploitation-attack-that-defeats-dynamic-anonymity/, last accesed on Jun. 7, 2021.
Kumar, K .V. et al. | Privacy Protection for Dynamic Data through Anonymization. International Journal of Scientific and Research Publications, vol. 2, Issue 9, Sep. 2012, ISSN 2250-3153, 4 pages.
Extended EP Search Report for EP Application No. 22178011.7 dated Oct. 27, 2022.

\* cited by examiner

FIG. 7A

| | \multicolumn{10}{c}{Applicant} |
|---|---|---|---|---|---|---|---|---|---|---|
| | 1 | 2 | 3 | 4 | 5 | 6 | 7 | 8 | 9 | 10 |
| Marital Status | Married | Married | Single | Married | Single | Single | Married | Single | Single | Single |
| Gender | Male | Male | Female | Male | Female | Female | Male | Male | Female | Female |
| Postal Code | 90210 | 90210 | 95120 | 90120 | 93111 | 95654 | 90210 | 90212 | 93111 | 90210 |
| Housing Status | Rent | Rent | Own | Own | Own | Own | Rent | Rent | Own | Rent |
| Employment Status | Employed | Employed | Employed | Not Employed | Employed | Employed | Employed | Employed | Employed | Not Employed |
| Insurance Status | Insured | Insured | Insured | Not Insured | Insured | Insured | Insured | Insured | Insured | Insured |
| Income | $60k | $65k | $40k | $0 | $80k | $25k | $90k | $40k | $105k | $0 |
| Birth Year | 1985 | 1982 | 1990 | 1998 | 1991 | 1975 | 1989 | 1965 | 1987 | 2002 |
| Credit Check Status | Good | Good | Good | Poor | Good | Poor | Good | Good | Good | Good |
| Highest Level of Education | College | College | Graduate | College | Highschool | Graduate | College | College | College | Highschool |

FIG. 7B

| | \multicolumn{10}{c}{Applicant} |
|---|---|---|---|---|---|---|---|---|---|---|
| | 1 | 2 | 3 | 4 | 5 | 6 | 7 | 8 | 9 | 10 |
| Marital Status | Married | Married | Single | Married | Single | Single | Married | Single | Single | Single |
| Gender | Male | Male | Female | Male | Female | Female | Male | Male | Female | Female |
| Postal Code | | | | | | | | | | |
| Postal Code (Chunked) | CA | CA | CA | CA | CA | CA | CA | CA | CA | CA |
| Housing Status | Rent | Rent | Own | Own | Own | Own | Rent | Rent | Own | Rent |
| Employment Status | Employed | Employed | Employed | Not Employed | Employed | Employed | Employed | Employed | Employed | Not Employed |
| Insurance Status | Insured | Insured | Insured | Not Insured | Insured | Insured | Insured | Insured | Insured | Insured |
| Income | | | | | | | | | | |
| Income (Chunked) | $60k | $70k | $40k | $0 | $80k | $30k | $90k | $40k | $110k | $0 |
| Birth Year | | | | | | | | | | |
| Birth Year (Chunked) | 1080s | 1980s | 1990s | 1990s | 1990s | 1070s | 1980s | 1960s | 1980s | 2000s |
| Credit Check Status | Good | Good | Good | Poor | Good | Poor | Good | Good | Good | Good |
| Highest Level of Education | College | College | Graduate | College | Highschool | Graduate | College | College | College | Highschool |

DYNAMIC ANONYMIZATION FOR AUTOMOTIVE SUBSCRIPTIONS

BACKGROUND

One or more embodiments herein relate to dynamic anonymization of data, and specifically, to anonymization of data that may include Personally Identifying Information.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate data anonymization.

The General Data Protection Regulation (GDPR) and California Consumer Privacy Act (CCPA) address various data privacy issues. To help facilitate data privacy, some existing approaches to dynamic anonymization relate to limiting the parameters and values that can be searched and/or queried upon. With such approaches, all data is still stored, though not all data can be queryable. This can be problematic because Personally Identifying Information (PII) is still stored in a data store. So long as PII is stored, such data could still be susceptible to a data breach. Therefore, there exists a need to better balance data privacy and security concerns with business value associated with data analytics.

According to an embodiment, a device comprises a memory, and a processor operatively coupled to the memory and comprising computer executable components comprising: a determination component that determines personally identifying data elements of data that comprise personally identifying information according to an anonymization criterion associated with personally identifying information being determined not to be satisfied by the personally identifying data elements, and a storage component that stores non-identifying data elements of the data to a non-identifying data store.

According to another embodiment, a computer-implemented method comprises determining, by a device comprising a processor, personally identifying data elements of data, representative of a group of transactions, that comprise personally identifying information according to an anonymization criterion associated with personally identifying information being determined not to be satisfied by the personally identifying data elements, and storing, by the device, non-identifying data elements of the data to a non-identifying data store.

According to yet another embodiment, a non-transitory machine-readable medium, comprising executable instructions that, when executed by a processor, facilitate performance of operations, comprising determining personally identifying data elements of data, representative of a group of transactions, that comprise personally identifying information according to an anonymization criterion associated with personally identifying information being determined not to be satisfied by the personally identifying data elements, and storing non-identifying data elements of the data to a non-identifying data store.

DESCRIPTION OF THE DRAWINGS

FIGS. 7A and 7B illustrate exemplary data sets in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It will be understood that when an element is referred to as being "coupled" to another element, it can describe one or more different types of coupling including, but not limited to, chemical coupling, communicative coupling, capacitive coupling, electrical coupling, electromagnetic coupling, inductive coupling, operative coupling, optical coupling, physical coupling, thermal coupling, and/or another type of coupling. As referenced herein, an "entity" can comprise a human, a client, a user, a computing device, a software application, an agent, a machine learning model, an artificial intelligence, and/or another entity. It should be appreciated that such an entity can facilitate implementation of the subject disclosure in accordance with one or more embodiments the described herein.

Figure 1:
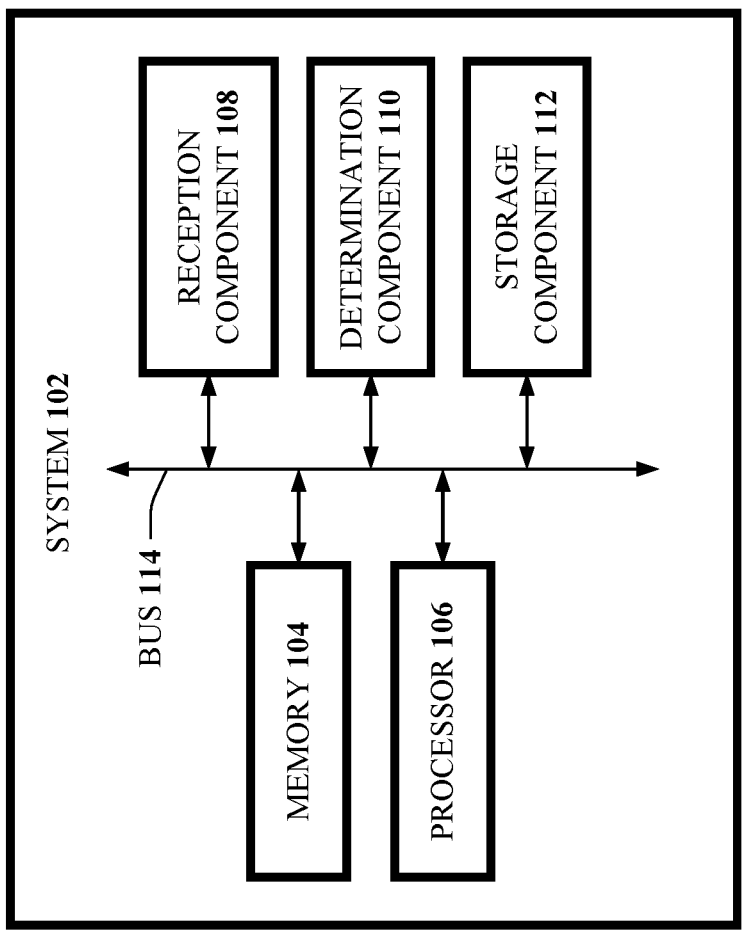
FIG. 1 illustrates a block diagram of an example, non-limiting system that can facilitate dynamic anonymization in accordance with one or more embodiments described herein.

FIG. 1 illustrates a block diagram of an example, non-limiting system 102 in accordance with one or more embodiments described herein. System 102 can comprise a memory 104, a processor 106, a reception component 108, a determination component 110, a storage component 112, and/or a bus 114. In various embodiments, one or more of the memory 104, processor 106, reception component 108, determination component 110, storage component 112, and/or bus 114 can be communicatively or operably coupled to one another to perform one or more functions of the system 102.

According to an embodiment, the reception component 108 can receive data or a data set. Such data can be representative of a group of transactions. Such transactions can comprise, for instance, automotive leases or purchases, residential leases, mortgage or other loan applications, credit card applications, bank account applications, or other financial transactions (e.g., for which personal data can be helpful for an entity to decide whether to approve an applicant). It is noted that such personal data can comprise, for instance, year of birth, income amount, postal code, state, country, military status, credit score or status, housing payment, debt-to-income ratio, marital status, gender, housing status, employment status, insurance status, highest level of education, bankruptcy history, or other personal data. Individual personal data can be combined with personal data of other individuals, so that various analytics can be performed on a combined data set (e.g., of data including the individual personal data and personal data of other individuals).

According to an embodiment, the determination component 110 can determine personally identifying data elements of the data that comprise Personally Identifying Information (PII). It is noted that such a determination can be performed using an anonymization criterion. In this regard, the determination component can compare data elements of a data set to an anonymization criterion in order to determine whether such data elements comprise PII data elements. Such an anonymization criterion can be associated with personally identifying information being determined not to be satisfied by the data elements if the data comprises anonymization greater than an anonymization threshold. Anonymization criteria or thresholds herein can be defined or can be determined using a lookup table, anonymization function, or otherwise determined.

According to an embodiment, an anonymization criterion herein can be associated with a data element similarity index. Such a similarity index can be representative of an amount of variance or statistical randomness among data elements of a data set. In another embodiment, the anonymization criterion can comprise a maximum range of possible values (e.g., for respective data elements) or a maximum theoretical range of possible values.

According to an embodiment, a threshold herein (e.g., an anonymization threshold) can comprise a quantity of data elements. It is noted that a threshold herein can comprise a quantity and a range of data elements, such that the corresponding data and distribution of values within the data as a whole does not comprise PII. According to an example, embodiments herein can consider income ranges within defined zip codes (e.g., using the determination component 110). If there exists a small enough quantity of customers within a certain zip code that can result in the identification of a certain person X having an income Y (e.g., values within the data), then the data comprises PII. Thus, the threshold is not large enough. However, if there exists a sufficient quantity of customers within a given zip code with sufficient variability of income ranges such that it would be impossible (or at least extremely difficult) to match an income Y to that certain person X, then the threshold can be considered large enough. Stated otherwise, thresholds herein can represent a quantity of values present such that the threshold is sufficiently large such that data as a whole does not comprise PII.

Anonymization herein can refer to the degree of variability in a data set. Generally, the more variability, the more difficult it is to identify an individual from a data element or data set. For instance, if a data set comprises one-hundred car owners who own a specific model car and live in zip code 90210, then absent other identifying data, it would be difficult to determine an individual car owner from the zip code data. However, if a data set only comprises two car owners who own that specific model car and live in zip code 90210, it would be significantly easier to identify an individual car owner using the zip code. According to an embodiment, a threshold level of anonymization can be defined or according to industry (e.g., industry type), legal, or corporation standards.

According to an embodiment, the determination component 110 can evaluate a category of data (e.g., a zip code) to determine whether the category of data comprises PII according to the anonymization criterion. In further embodiments, the determination component 110 can evaluate multiple categories of data to determine whether, individually or in the aggregate, such categories of data comprise PII. For example, if there exist too few customers within a given zip code (e.g., 90210) to maintain anonymity, then such data can comprise PII. Thus, to prevent the data from comprising PII, zip codes surrounding 90210 can be aggregated achieve a larger quantity of individuals represented in the data. In this regard, data that otherwise may have comprised PII can be prevented from comprising the PII.

In another embodiment, the determination component 110 can prevent a data set from being queryable at all if, for instance, the size of the data set is less than a threshold value (e.g., n), where n is determined by the determination component 110 to be the minimum data size to make the data not PII. It is noted that the minimum size can depend on industry type. It is also noted that n can represent a size criterion or threshold (e.g., for an entire data set). In further embodiments, a size criterion or threshold (e.g., n) can be based on a type of data element of data elements. For instance, a size criterion associated with postal codes can be different from a size criterion associated with marital status.

It is noted that the value of n can be dynamically determined based on the degree of anonymization or randomness of certain data fields, especially including sensitive fields such as income or employment status. According to an example, randomness can be determined (e.g., by the determination component 110) according to a distribution. For instance, if there exist four levels of income, and the distribution is approximately 25% in each level, then the data can be determined to be sufficiently random (e.g., by the determination component 110). However, if there exist only 10% of the data in each of the lower three levels and 70% of the data in the single highest level, then the randomness of the data can be determined to be low (e.g., by the determination component 110). Thus, more data (e.g., a larger threshold) can be required to ensure anonymity. In this regard, n can vary according to a level of sensitivity of data elements and thus a minimum quantity of personally identifying elements can vary based on a level of sensitivity of the personally identifying data elements. In other embodiments, the minimum quantity of personally identifying data elements can vary according to a level of accessibility of the personally identifying data elements (e.g., ease of accessing the information).

According to another embodiment, the determination component 110 can account for the distribution or randomness of some fields that have fixed values (e.g., marital status, gender, postal code, housing status, employment status, insurance status, credit status, and/or highest level of education, among others). For example, if the distribution of these fields is spread out and/or random, then the threshold value n can be smaller. However, if the distribution or randomness of some of these fields is not at all well-distributed or random (e.g., the large majority of employment status values is "Employed" and not any of the other possible values), then the threshold value n would need to be higher.

Memory 104 can store one or more computer/machine readable and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to system 102, reception component 108, determination component 110, storage component 112, or other components. Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. It can be appreciated that the memory 104 can store data herein (e.g., from the storage component 112).

Processor 106 can comprise one or more types of processors and/or electronic circuitry (e.g., a classical processor, graphics processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor.

Bus 114 can comprise one or more memory bus, memory controller, peripheral bus, external bus, local bus, a quantum bus, and/or another type of bus that can employ various bus architectures (e.g., industrial standard architecture (ISA), extended ISA (EISA), micro-channel architecture (MSA), intelligent drive electronics (IDE), advanced graphics port (AGP), VESA local bus (VLB), peripheral component interconnect (PCI), universal serial bus (USB), card bus, small computer systems interface (SCSI), firewire (IEEE 1394), etc.).

Figure 2:
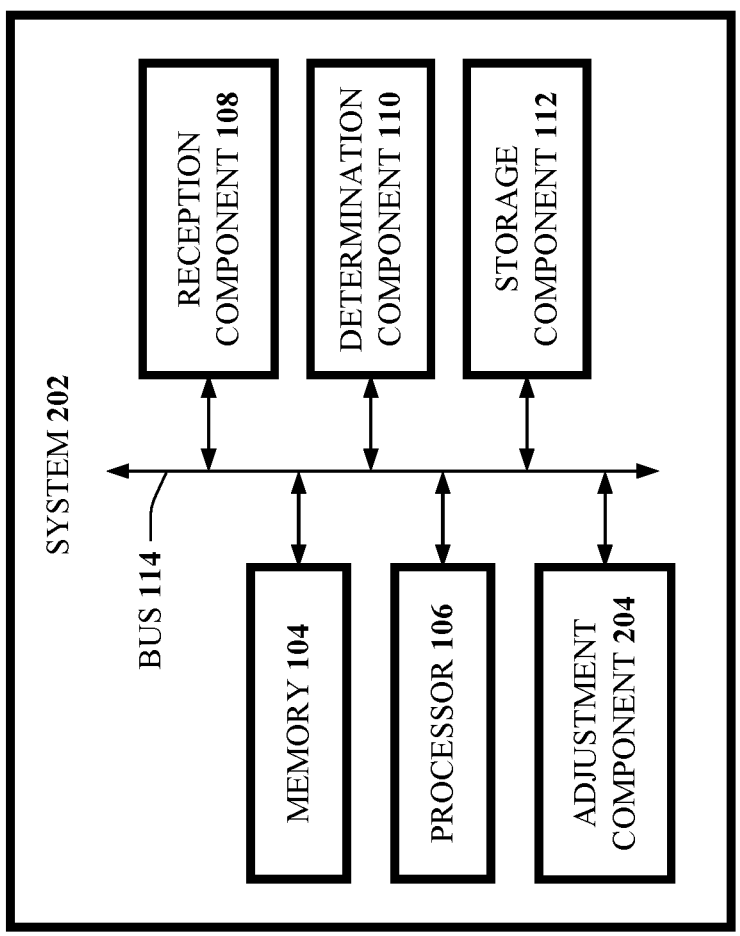
FIG. 2 illustrates a block diagram of an example, non-limiting system that can facilitate dynamic anonymization in accordance with one or more embodiments described herein.

FIG. 2 illustrates a block diagram of an example, non-limiting system 202 in accordance with one or more embodiments described herein. System 202 can be similar to system 102, and can comprise a memory 104, a processor 106, a reception component 108, a determination component 110, a storage component 112, and/or a bus 114. Repetitive description of like elements and/or processes employed in respective embodiments is omitted for sake of brevity.

System 202 can additionally comprise an adjustment component 204. In various embodiments, one or more of the memory 104, processor 106, reception component 108, determination component 110, storage component 112, bus 114, and/or adjustment component 204 can be communicatively or operably coupled to one another to perform one or more functions of the system 202.

Embodiments herein can reduce the frequency for the need to conduct interactive anonymization and increase the frequency for performing static anonymization. The foregoing can be accomplished, for instance, by applying domain-specific knowledge to the data being assessed (e.g., by the determination component 110 or artificial intelligence component 304 as later discussed in greater detail). Correlated interactions between two fields can enable a reduction in the size of n. According to an embodiment, a multiplier can be applied (e.g., using the adjustment component 204) to each field that requires additional variance to ensure that the data is not considered PII. According to an example, numbers can be randomly generated within a range for each enumeration value (e.g., by the adjustment component 204). For instance, with employment status, valuers comprising 0-500 can be considered unemployed and values comprising 500-1000 can be considered employed. Thus, the determination component can determine a random number within the range for each data element of the data. Thus, without domain-specific knowledge (e.g., 500 as the cut-point), a third party cannot determine the employment status. Furthermore, ranges can vary depending on data values. For instance, data comprises 1000 rows, 200 of which represent unemployed and 800 of which represent employed, the cut point can be 200, and thus the data can appear as an average distribution 0-1000.

According to another embodiment, n can comprise a threshold value, the threshold value dictating whether to conduct interactive anonymization or static anonymization. According to an example, a size of a database can be slightly smaller than size n. In this example, if there is one column or row in the database whose removal would make the threshold value n2 small enough such that the size of the database is larger than n2, then a second copy of the database can be made, chunking that one specific row or column. In this regard, static anonymization could be achieved with this adjusted database just by removing one row or column. This could also be conducted for two columns or rows, and so on.

According to an example, income information associated with an individual can be modified (e.g., changed from a value to a range of values) by the adjustment component 204 so that an individual cannot be identified.

According to an embodiment, the adjustment component 204 can round some of the numeric values of data elements of a data set to a lower level of precision, for instance, if the size of the data set is small. According to an example, income amount can be rounded to the nearest thousand dollars if the size of the dataset is >1000 (e.g., persons/customers), income amount (e.g., annual income) can be rounded to the nearest ten thousand dollars if the size of the dataset is >100, and income amount can be rounded to the nearest fifty thousand dollars if the size of the dataset is >50. In an embodiment, the determination component 110 can prevent storage of an entire data set if the size of the dataset is <=50. However, the determination component 110 can permit storage of the data set if, for instance, the adjustment component 204 adjusts the data (e.g., rounds income amount to the nearest fifty thousand dollars). A similar approach can use used for year of birth and/or housing monthly payment. For instance, a year of birth can be rounded to a decade of birth (e.g., 1980s).

In another embodiment, the adjustment component 204 can chunk or round certain values if the data size of a data set is small (e.g., and thus comprises PII). For example, if a data set only comprises a small number of auto or subscription orders, a birth year, income amount, and/or postal code can be chunked. As an example, postal code from the data set represented in FIG. 7A is omitted from a stored data set (e.g., by the storage component 112—see FIG. 7B) and is instead replaced with respective chunked values.

According to an embodiment, chunking herein (e.g., as facilitated by the adjustment component 204) can comprise grouping or rounding of data as discussed above. In this regard, data elements that can result in identification of an associated individual can be rounded or generalized such that the data elements can be grouped into grouping(s) large enough in order to prevent such data elements from resulting in identification of an associated individual.

In further embodiments, chunking of data can comprise mapping of data in an n-dimensional space. In this regard, each of a data column can be treated as a dimension in space. If there exist n columns, then a system herein can construct an n-dimensional space. In this regard, each row of data can comprise a data point in n-dimensional space. Thus, an appropriate threshold can comprise an n-dimensional cuboid in space (e.g., a rectangle in 2-D space). Further in this regard, for each dimension, any required grouping or mapping can be determined (e.g., by the determination component 110) in order to maintain anonymity. According to an example, each dimension can comprise angles 90 degrees different from one another. In this regard, there would not be any measurable statistical similarity between dimensions. It is noted that an amount of variation needed to maintain anonymity between dimensions can be determined according to an anonymity function. If, for instance, dimensional variation does not satisfy a variation threshold (e.g., as determined by the determination component 110), then further chunking can be performed. It is noted that each dimension can correspond to each data element type (e.g., marital status, gender, postal code, housing status, employment status, insurance status, income, birth year, credit check status, highest level of education, etc.)

According to an embodiment, if more data is later added (e.g., to a data set by the reception component 108) such that a data element in a data set can no longer comprise PII, then that data element can be un-chunked (e.g., by the adjustment component 204).

Figure 3:
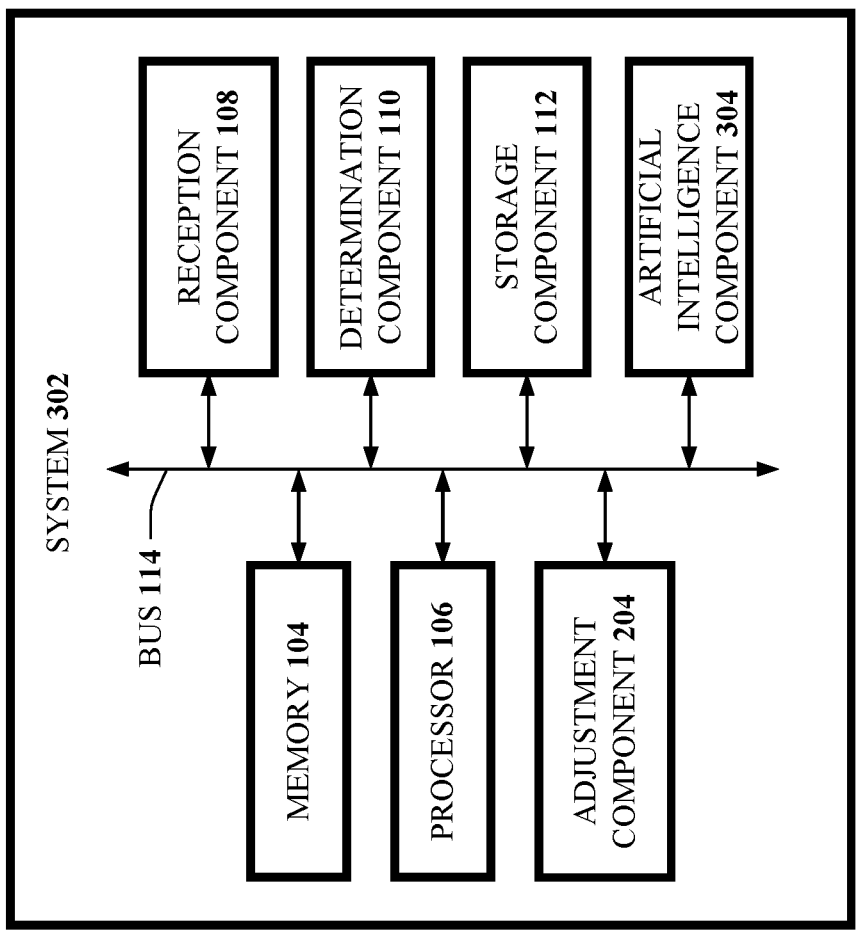
FIG. 3 illustrates a block diagram of an example, non-limiting system that can facilitate dynamic anonymization in accordance with one or more embodiments described herein.

FIG. 3 illustrates a block diagram of an example, non-limiting system 302 in accordance with one or more embodiments described herein. System 302 can be similar to system 202, and can comprise a memory 104, a processor 106, a reception component 108, a determination component 110, a storage component 112, a bus 114, and/or adjustment component 204. Repetitive description of like elements and/or processes employed in respective embodiments is omitted for sake of brevity.

System 302 can additionally comprise an artificial intelligence component 304. Artificial-intelligence or machine learning systems and techniques can be employed to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

Artificial intelligence component 304 can learn to determine PII, learn to mitigate PII, and/or learn to adjust data in order to make a data set comprising PII in addition to other functions of the system 302. For example, artificial intelligence component 304 can comprise and/or employ an artificial intelligence (AI) model and/or a machine learning (ML) model that can learn to perform the above or below described functions (e.g., via training using historical training data and/or feedback data). In an embodiment, the artificial intelligence component 304 can learn to determine thresholds or sizes herein, such as n. The artificial intelligence component 304 can further learn to determine whether data comprises PII and learn to determine optimal prevention of PII storage. In another example, the artificial intelligence component 304 can leverage machine learning in order to weigh data elements that, either individually or in an aggregate, exceed a defined level of identifiability.

In some embodiments, artificial intelligence component 304 can comprise an AI and/or ML model that can be trained (e.g., via supervised and/or unsupervised techniques) to perform the above-described functions using historical training data comprising various context conditions that correspond to dynamic anonymization operations. In this example, such an AI and/or ML model can further learn (e.g., via supervised and/or unsupervised techniques) to perform the above-described functions using training data comprising feedback data, where such feedback data can be collected and/or stored (e.g., in memory 104) by artificial intelligence component 304. In this example, such feedback data can comprise the various instructions described above/ below that can be input, for instance, to a system 302, over time in response to observed/stored context-based information. In some embodiments, based on learning to perform the functions described above, artificial intelligence component 304 can perform such functions in the same manner and/or using the same resources as those of reception component 108, determination component 110, storage component 112, bus 114, and/or adjustment component 204.

Artificial intelligence component 304 can initiate an operation associated with PII and/or dynamic anonymization based on a defined level of confidence determined using information (e.g., feedback data). For example, based on learning to perform such functions described above using the above defined feedback data, artificial intelligence component 304 can initiate an operation if it determines, based on such feedback data, that a data set can comprise PII or that storing an entire data set can increase the risk of exposing PII in the event of a data breach. For instance, based on learning to perform such functions described above using the above defined feedback data, artificial intelligence component 304 can determine appropriate actions in response to a determination that dataset comprises PII.

In an embodiment, artificial intelligence component 304 can perform a utility-based analysis that factors cost of initiating the above-described operations associated with PII and/or dynamic anonymization versus benefit. In this embodiment, artificial intelligence component 304 can use one or more additional context conditions to determine whether PII exists in a data set and/or whether any data adjustment action should be taken.

To facilitate the above-described functions, artificial intelligence component 304 can perform classifications, correlations, inferences, and/or expressions associated with principles of artificial intelligence. For instance, artificial intelligence component 304 can employ an automatic classification system and/or an automatic classification. In one example, artificial intelligence component 304 can employ a probabilistic and/or statistical-based analysis (e.g., factoring into the analysis utilities and costs) to learn and/or generate inferences. Artificial intelligence component 304 can employ any suitable machine-learning based techniques, statistical-based techniques and/or probabilistic-based techniques. For example, artificial intelligence component 304 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, artificial intelligence component 304 can perform a set of machine learning computations. For instance, artificial intelligence component 304 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 4:
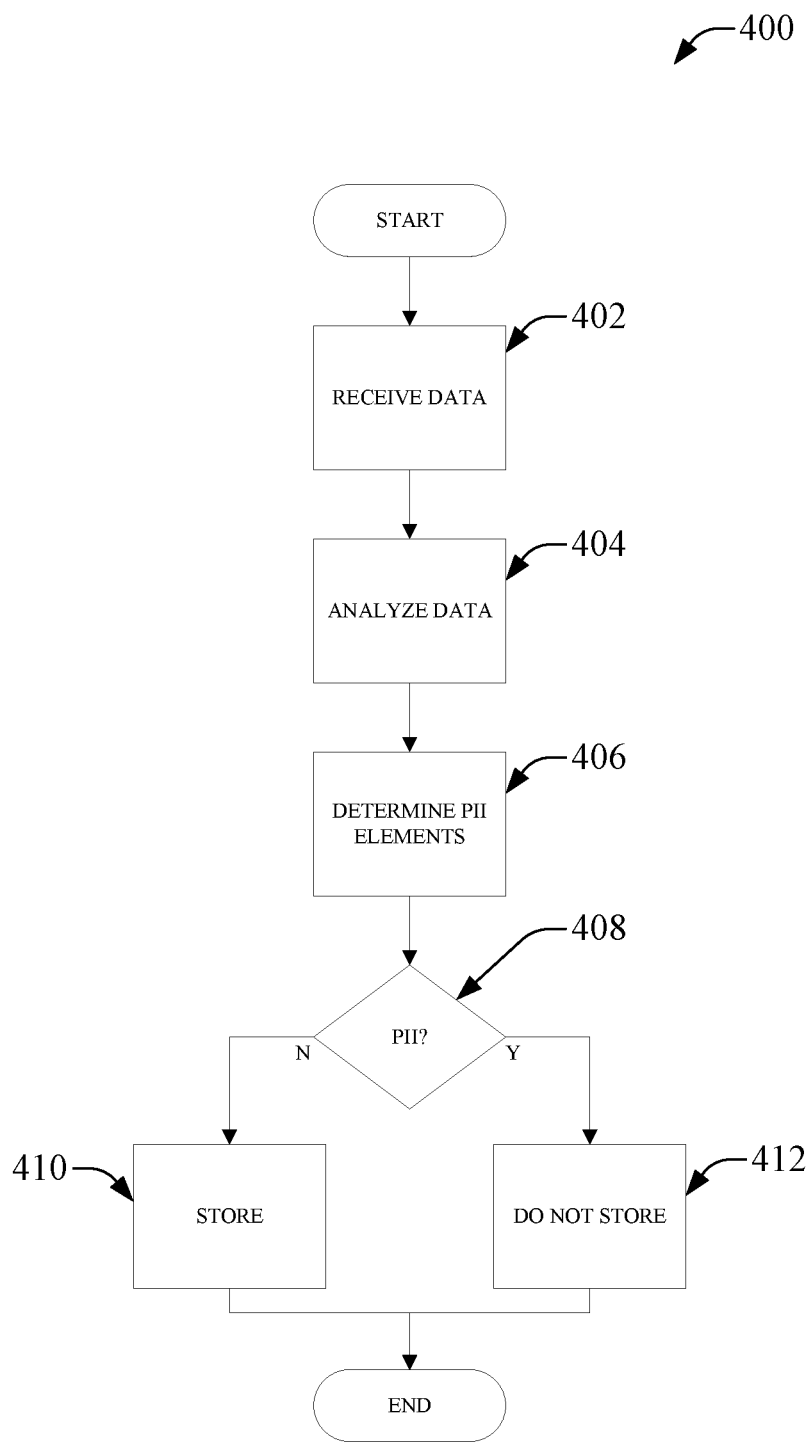
FIG. 4 illustrates a flow chart of an example, non-limiting process for dynamic anonymization in accordance with one or more embodiments described herein.

FIG. 4 illustrates a flow chart of an example, non-limiting flowchart of a process 400 for dynamic anonymization in accordance with one or more embodiments described herein. At 402, data can be received (e.g., via reception component 108). Such data can be captured, for instance, by the reception component 108. Data or a data set herein can be received by the reception component 108 from a server or other external source (not depicted). In this regard, data can be aggregated and/or incrementally increased (e.g., as new customers are acquired). At 404, the received data can be analyzed (e.g., by the determination component 110). In this regard, PII data elements from the data can be determined at 406. If at 408, a data element comprises PII, then the process 400 can proceed to 412. If at 408, a data element does not comprise PII, then the process 400 can proceed to 410. At 410, the data element can be stored (e.g., by the storage component 112). At 412, the data element can be discarded (e.g., by the storage component 112).

Figure 5:
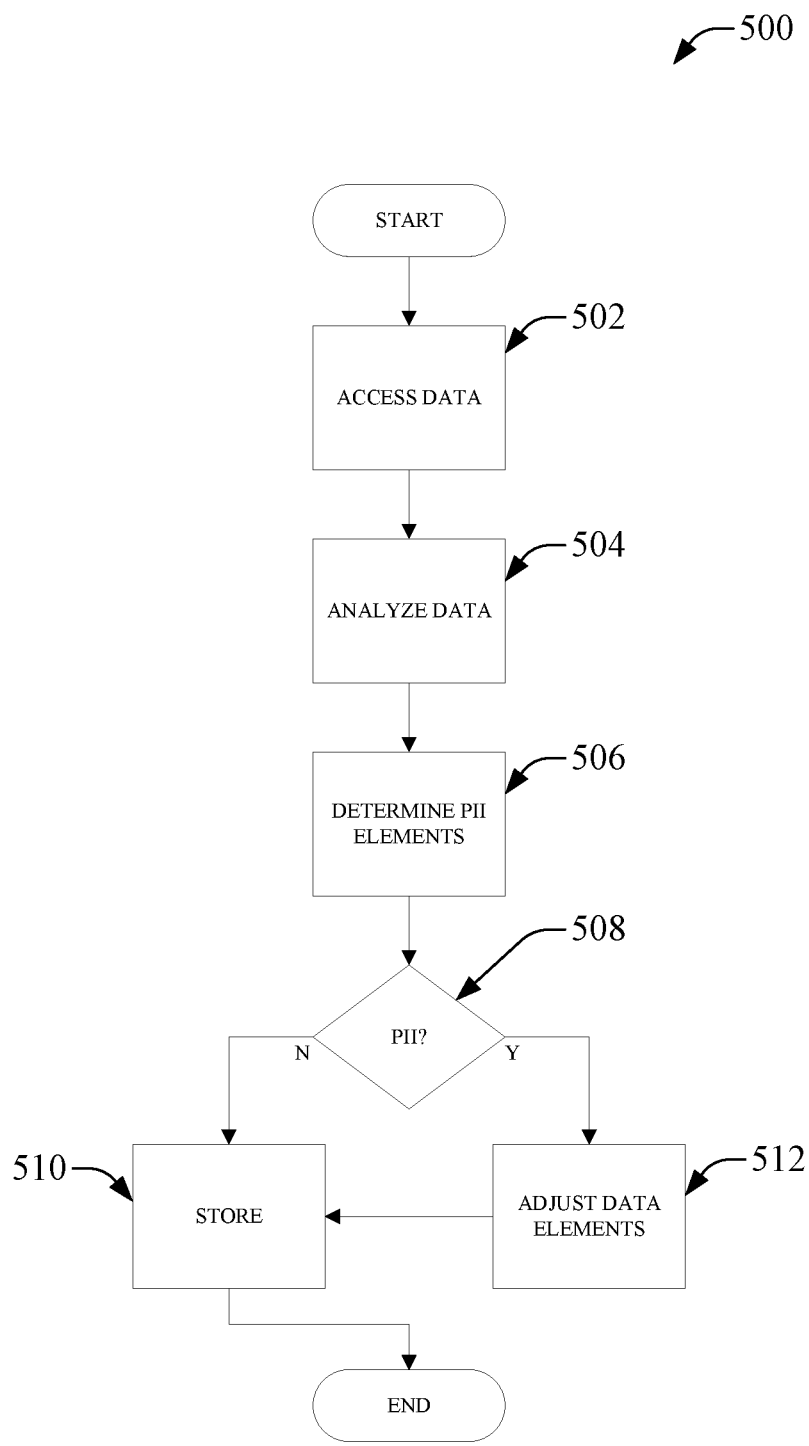
FIG. 5 illustrates a flow chart of an example, non-limiting process for dynamic anonymization in accordance with one or more embodiments described herein.

FIG. 5 illustrates a flow chart of an example, non-limiting flowchart of a process 500 for dynamic anonymization in accordance with one or more embodiments described herein. At 502, data can be received (e.g., via reception component 108). Such data can be captured, for instance, by the reception component 108. At 504, the received data can be analyzed (e.g., by the determination component 110). In this regard, PII elements from the data can be determined at 506. If at 508, a data element comprises PII, then the process 500 can proceed to 512. If at 508, a data element does not comprise PII, then the process 500 can proceed to 510. At 510, the data element can be stored (e.g., by the storage component 112). At 512, the data element can be adjusted (e.g., by the adjustment component 204). Such an adjustment can comprise rounding or a different adjustment. In other embodiments, such an adjustment can comprise chunking the data in a multi-dimensional space.

Figure 6:
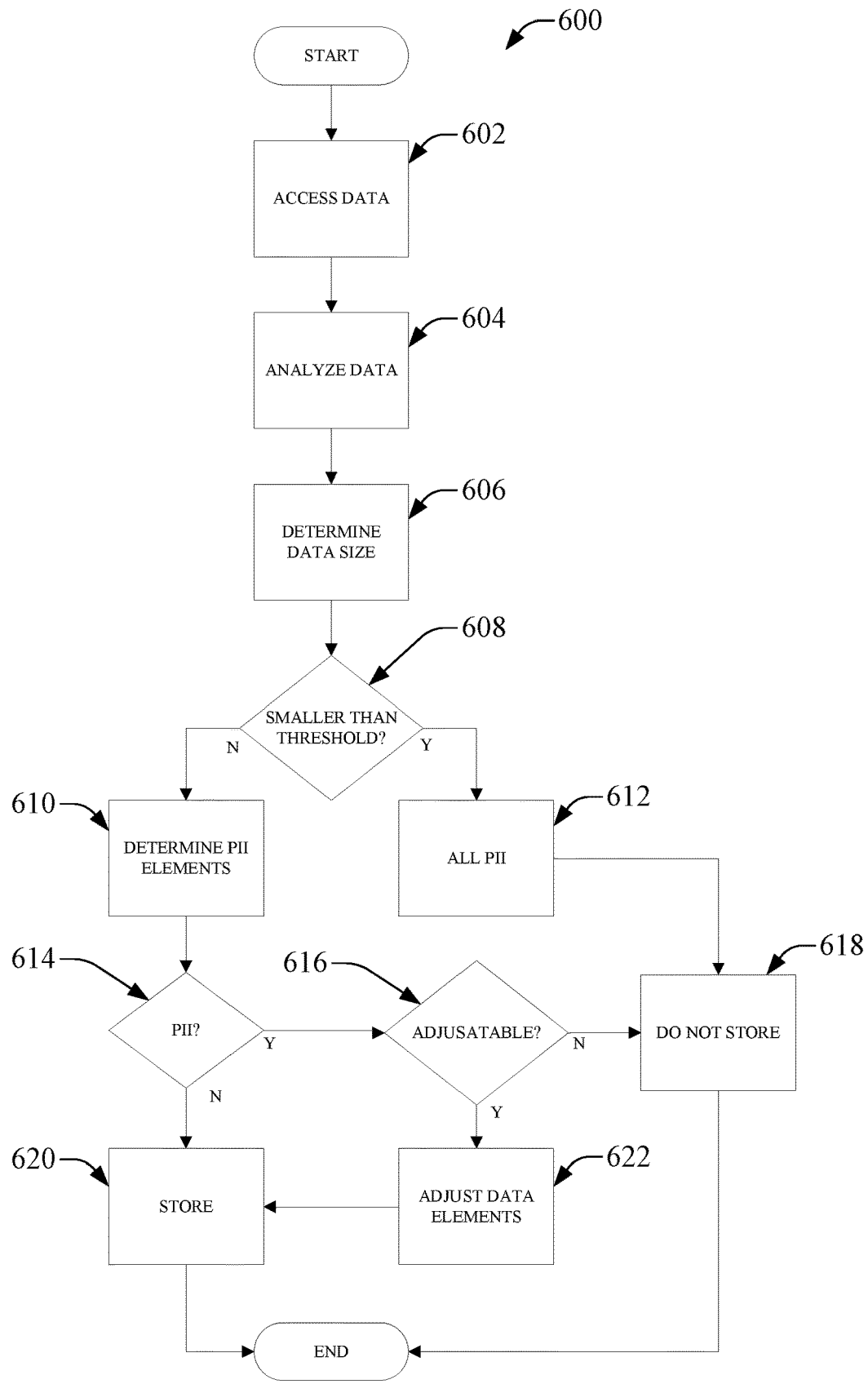
FIG. 6 illustrates a flow chart of an example, non-limiting process for dynamic anonymization in accordance with one or more embodiments described herein.

FIG. 6 illustrates a flow chart of an example, non-limiting flowchart of a process 600 for dynamic anonymization in accordance with one or more embodiments described herein. At 602, data can be accessed (e.g., by the reception component 108). Such data can be captured, for instance, by the reception component 108. At 604, the received data can be analyzed (e.g., by the determination component 110). In this regard, a size of the data (e.g., a quantity of entries, rows, columns, or other suitable measurements) can be determined at 606. If at 608, the data is smaller than a data size threshold, the process 600 can proceed to 612. If at 610, the data is not smaller than a data size threshold, then the process 600 can proceed to 610. At 612, the received data can be entirely treated as PII, and the process 600 can proceed to 618. At 618, the PII is not stored (e.g., discarded) and the process can end. At 610, PII elements can be determined. At 614, if a data element does not comprise PII, then that element can be stored at 620. At 614, if a data element does comprise PII, the process can proceed to 616 at which it is determined whether the data element is adjustable. If a data element is not adjustable (e.g., roundable), then the process can proceed to 618 at which the data element is not stored or discarded. At 616, if the data element is adjustable, then the data element can be adjusted at 622 and the adjusted data element can be stored at 620. It is noted that such an adjustment can comprise chunking the data in a multi-dimensional space (e.g., n-dimensional space).

Figure 8:
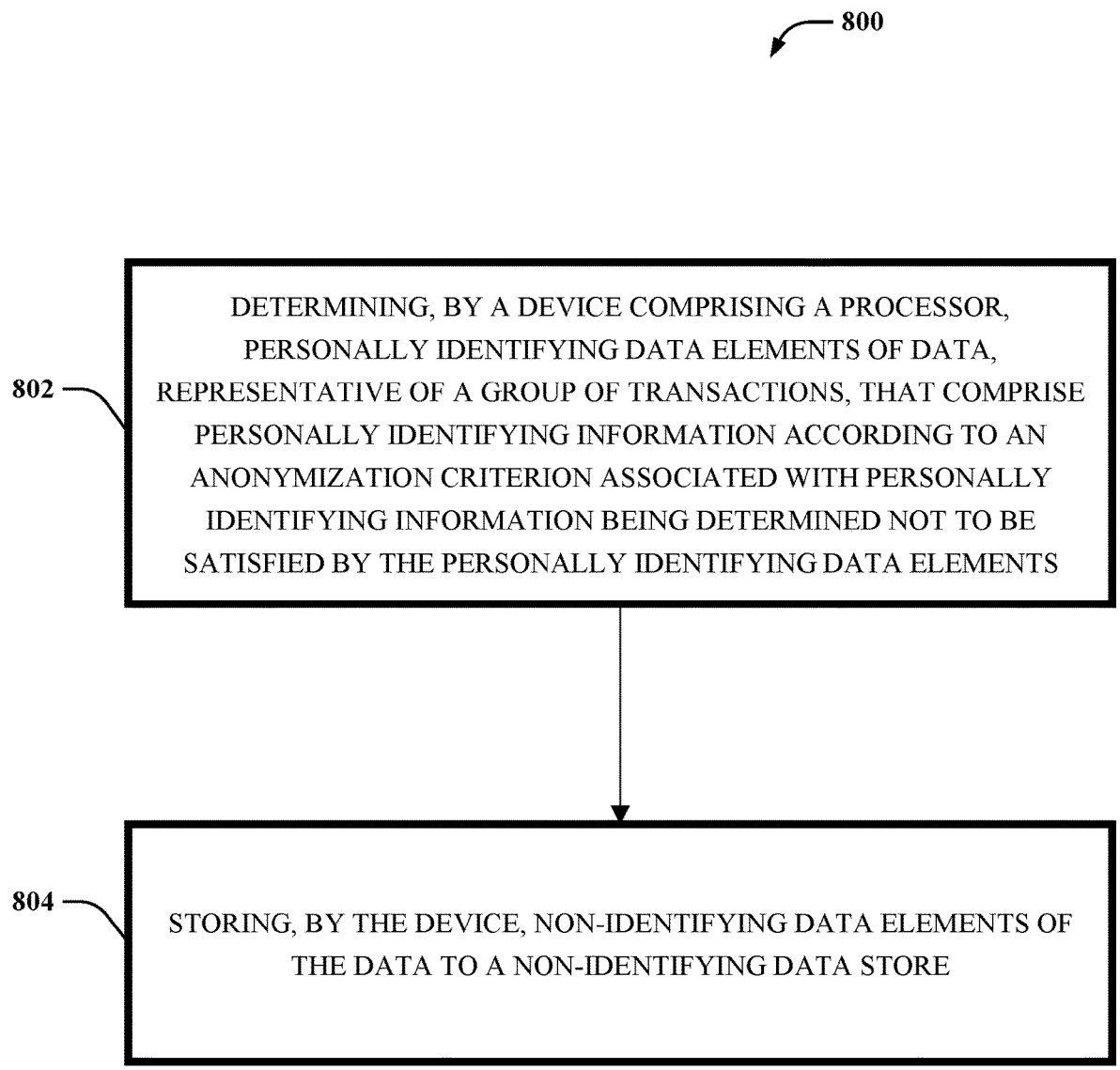
FIG. 8 illustrates a flow diagram of an example, non-limiting computer-implemented method for dynamic anonymization in accordance with one or more embodiments described herein.

FIG. 8 illustrates a flow diagram of an example, non-limiting computer-implemented method 800 that can store non-PII data in accordance with one or more embodiments described herein. Repetitive description of like elements and/or processes employed in respective embodiments is omitted for sake of brevity. At 802, computer-implemented method 800 can comprise determining, by a device comprising a processor, personally identifying data elements of data, representative of a group of transactions, that comprise personally identifying information according to an anonymization criterion associated with personally identifying information being determined not to be satisfied by the personally identifying data elements. At 804, the computer-implemented method 800 can comprise storing, by the device, non-identifying data elements of the data to a non-identifying data store.

Figure 9:
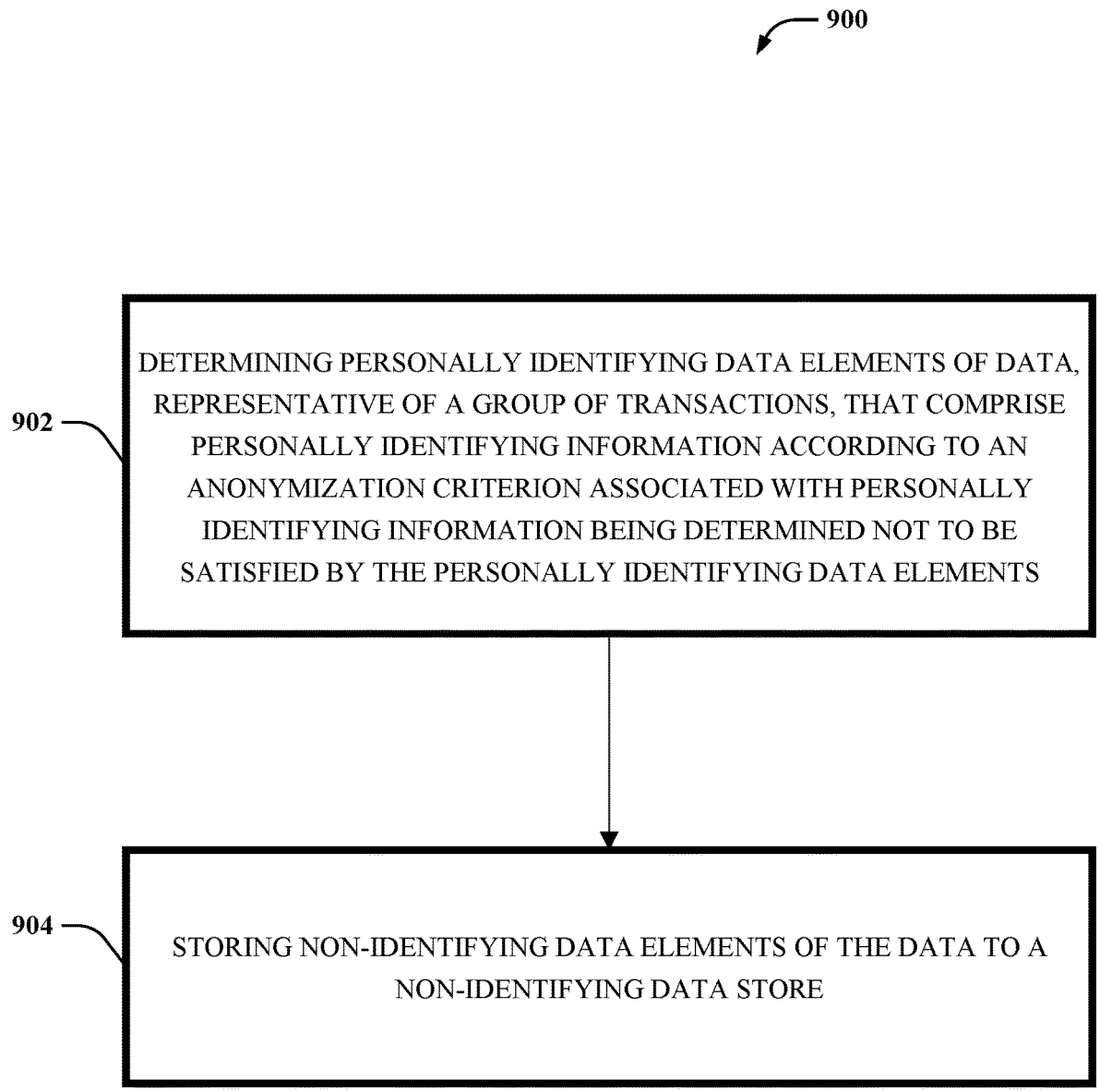
FIG. 9 illustrates a flow diagram of exemplary operations for dynamic anonymization as facilitated by a non-transitory machine-readable medium in accordance with one or more embodiments described herein.

FIG. 9 illustrates a flow diagram of example, non-limiting non-transitory machine-readable medium, comprising executable instructions that, when executed by a processor, facilitate performance of operations 900 that can store non-PII data in in accordance with one or more embodiments described herein. Repetitive description of like elements and/or processes employed in respective embodiments is omitted for sake of brevity. At 902, the operations 900 can comprise determining personally identifying data elements of data, representative of a group of transactions, that comprise personally identifying information according to an anonymization criterion associated with personally identifying information being determined not to be satisfied by the personally identifying data elements. At 904, the operations 900 can comprise storing non-identifying data elements of the data to a non-identifying data store.

Systems described herein can be coupled (e.g., communicatively, electrically, operatively, optically, etc.) to one or more local or remote (e.g., external) systems, sources, and/or devices (e.g., electronic control systems (ECU), classical and/or quantum computing devices, communication devices, etc.). For example, system 102 (or other systems, controllers, processors, etc.) can be coupled (e.g., communicatively, electrically, operatively, optically, etc.) to one or more local or remote (e.g., external) systems, sources, and/or devices using a data cable (e.g., High-Definition Multimedia Interface (HDMI), recommended standard (RS), Ethernet cable, etc.) and/or one or more wired networks described below.

In some embodiments, system herein can be coupled (e.g., communicatively, electrically, operatively, optically, etc.) to one or more local or remote (e.g., external) systems, sources, and/or devices (e.g., electronic control units (ECU), classical and/or quantum computing devices, communication devices, etc.) via a network. In these embodiments, such a network can comprise one or more wired and/or wireless networks, including, but not limited to, a cellular network, a wide area network (WAN) (e.g., the Internet), and/or a local area network (LAN). For example, system 102 can communicate with one or more local or remote (e.g., external) systems, sources, and/or devices, for instance, computing devices using such a network, which can comprise virtually any desired wired or wireless technology, including but not limited to: powerline ethernet, wireless fidelity (Wi-Fi), BLUETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In this example, system 102 can thus include hardware (e.g., a central processing unit (CPU), a transceiver, a decoder, an antenna (e.g., a ultra-wideband (UWB) antenna, a BLUETOOTH® low energy (BLE) antenna, etc.), quantum hardware, a quantum processor, etc.), software (e.g., a set of threads, a set of processes, software in execution, quantum pulse schedule, quantum circuit, quantum gates, etc.), or a combination of hardware and software that facilitates communicating information between a system herein and remote (e.g., external) systems, sources, and/or devices (e.g., computing and/or communication devices such as, for instance, a smart phone, a smart watch, wireless earbuds, etc.).

System herein can comprise one or more computer and/or machine readable, writable, and/or executable components and/or instructions that, when executed by processor (e.g., a processor 106 which can comprise a classical processor, a quantum processor, etc.), can facilitate performance of operations defined by such component(s) and/or instruction(s). Further, in numerous embodiments, any component associated with a system herein, as described herein with or without reference to the various figures of the subject disclosure, can comprise one or more computer and/or machine readable, writable, and/or executable components and/or instructions that, when executed by a processor, can facilitate performance of operations defined by such component(s) and/or instruction(s). Consequently, according to numerous embodiments, system herein and/or any components associated therewith as disclosed herein, can employ a processor (e.g., processor 106) to execute such computer and/or machine readable, writable, and/or executable component(s) and/or instruction(s) to facilitate performance of one or more operations described herein with reference to system herein and/or any such components associated therewith.

Systems herein can comprise any type of system, device, machine, apparatus, component, and/or instrument that comprises a processor and/or that can communicate with one or more local or remote electronic systems and/or one or more local or remote devices via a wired and/or wireless network. All such embodiments are envisioned. For example, a system (e.g., a system 302 or any other system or device described herein) can comprise a computing device, a general-purpose computer, a special-purpose computer, an onboard computing device, a communication device, an onboard communication device, a server device, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Figure 10:
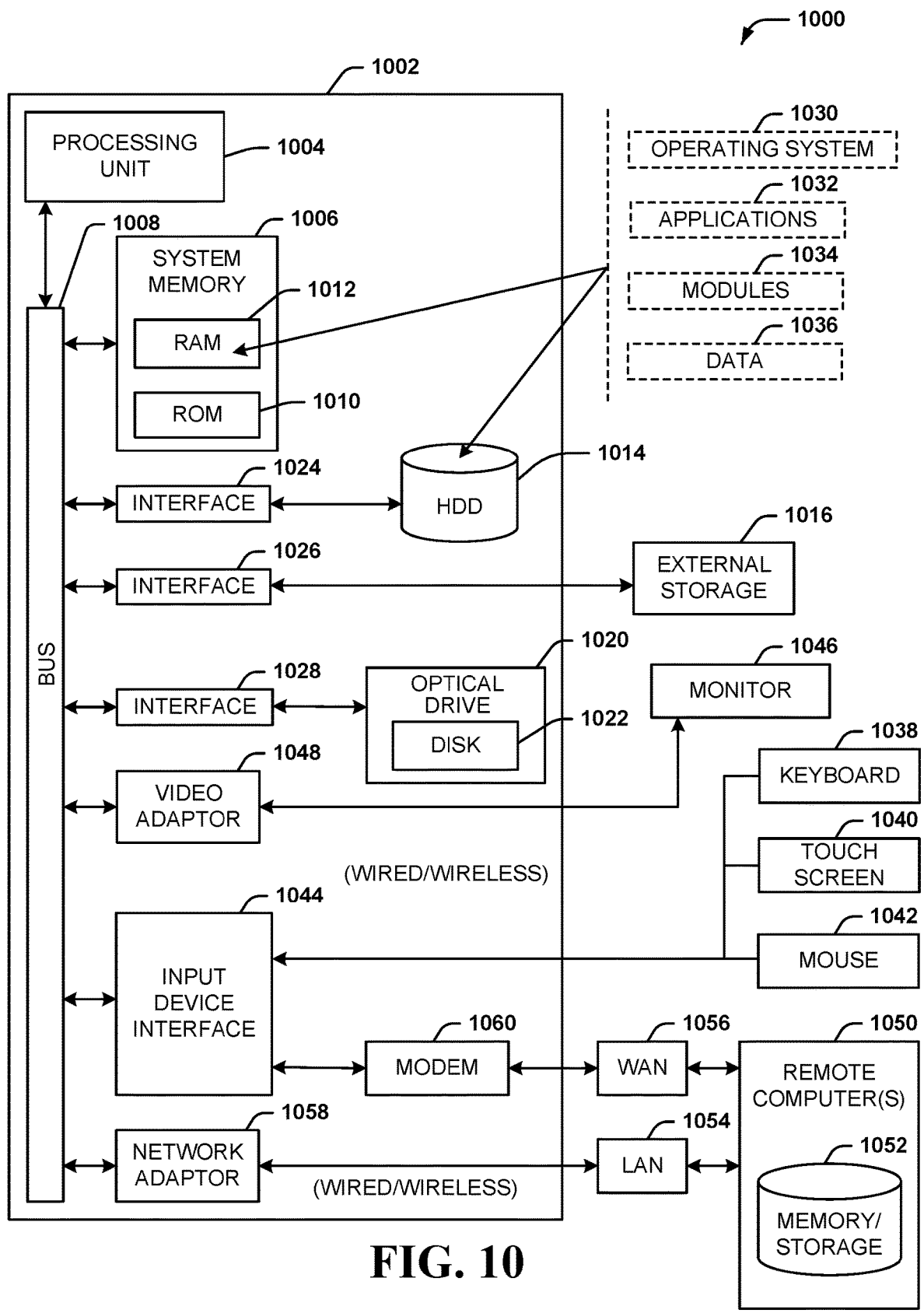
FIG. 10 is an example, non-limiting computing environment in which one or more embodiments described herein can be implemented.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
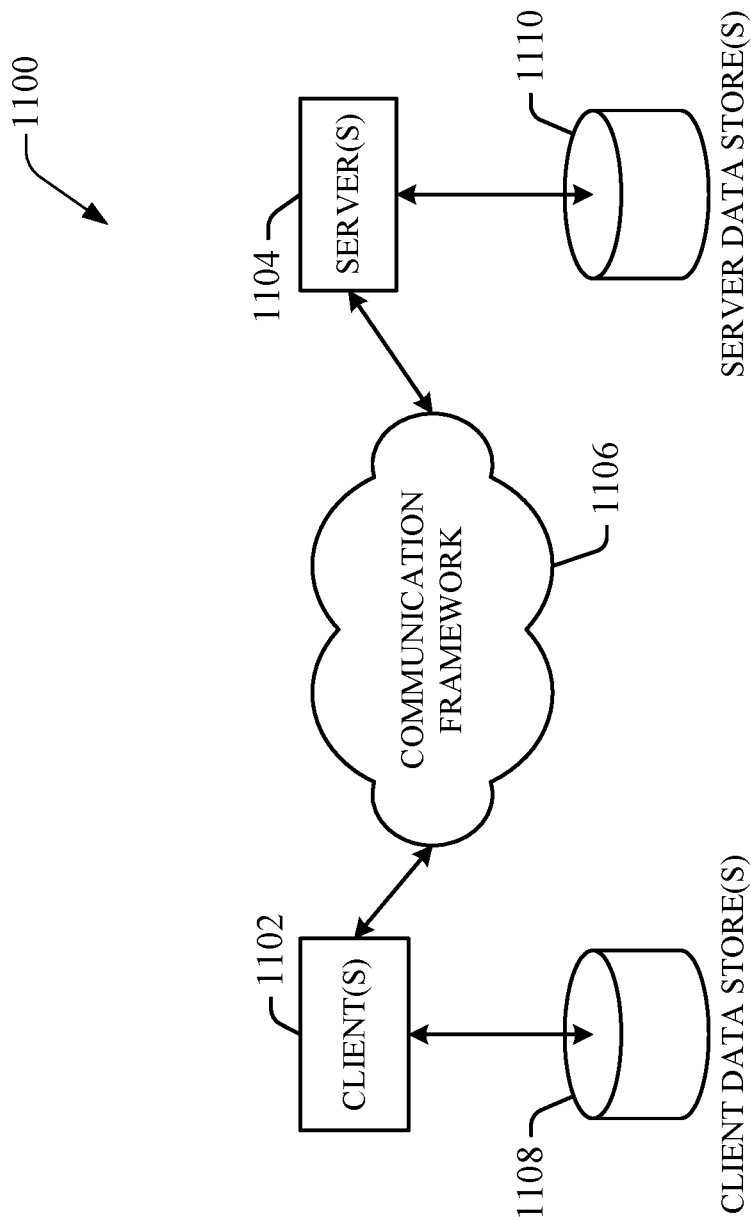
FIG. 11 is an example, non-limiting networking environment in which one or more embodiments described herein can be implemented.

Referring now to FIG. 11, there is illustrated a schematic block diagram of a computing environment 1100 in accordance with this specification. The system 1100 includes one or more client(s) 1102, (e.g., computers, smart phones, tablets, cameras, PDA's). The client(s) 1102 can be hardware and/or software (e.g., threads, processes, computing devices). The client(s) 1102 can house cookie(s) and/or associated contextual information by employing the specification, for example.

The system 1100 also includes one or more server(s) 1104. The server(s) 1104 can also be hardware or hardware in combination with software (e.g., threads, processes, computing devices). The servers 1104 can house threads to perform transformations of media items by employing aspects of this disclosure, for example. One possible communication between a client 1102 and a server 1104 can be in the form of a data packet adapted to be transmitted between two or more computer processes wherein data packets can include coded analyzed headspaces and/or input. The data packet can include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

In one exemplary implementation, a client 1102 can transfer an encoded file, (e.g., encoded media item), to server 1104. Server 1104 can store the file, decode the file, or transmit the file to another client 1102. It is to be appreciated, that a client 1102 can also transfer uncompressed file to a server 1104 and server 1104 can compress the file and/or transform the file in accordance with this disclosure. Likewise, server 1104 can encode information and transmit the information via communication framework 1106 to one or more clients 1102.

The illustrated aspects of the disclosure can also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature can be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further aspects of the invention are provided by the subject matter of the following clauses:

1. A device, comprising:
    a memory; and
    a processor operatively coupled to the memory and comprising computer executable components comprising:
        a determination component that determines personally identifying data elements of data that comprise personally identifying information according to an anonymization criterion associated with personally identifying information being determined not to be satisfied by the personally identifying data elements; and
        a storage component that stores non-identifying data elements of the data to a non-identifying data store.

2. The device of any preceding clause, wherein the anonymization criterion is associated with a data element similarity index.

3. The device of any preceding clause, wherein the anonymization criterion is associated with a maximum range of possible values.

4. The device of any preceding clause, further comprising:
    an adjustment component that rounds the personally identifying data elements, wherein the rounding converts the personally identifying data elements into converted non-identifying data elements, and wherein the storage component stores the converted non-identifying data elements to the non-identifying data store.

5. The device of any preceding clause, wherein the adjustment component rounds a year of birth to a decade of birth.

6. The device of any preceding clause, wherein the adjustment component rounds an income amount to the nearest ten-thousand dollars.

7. The device of any preceding clause, wherein the determination component determines a size of the data, and in response to the size of the data to be smaller than a size criterion, determines that all of the data comprise the personally identifying data elements.

8. The device of any preceding clause, wherein the adjustment component adjusts the size criterion based upon a type of data element of the data elements.

9. The device of any preceding clause, wherein the anonymization criterion is associated with a minimum quantity of personally identifying data elements.

10. The device of any preceding clause, wherein the minimum quantity of personally identifying data elements is based on an industry type associated with the data.

11. The device of any preceding clause, wherein the minimum quantity of personally identifying data elements is based on a level of sensitivity of the personally identifying data elements.

12. The device of any preceding clause, wherein the minimum quantity of personally identifying data elements is based on a level of accessibility of the personally identifying data elements.

13. The device of any preceding clause, wherein the adjustment components chunks the data in a multi-dimensional space.

14. The device of clause 1 above with any set of combinations of the devices 2-13 above.

15. A computer-implemented method, comprising:
    determining, by a device comprising a processor, personally identifying data elements of data, representative of a group of transactions, that comprise personally identifying information according to an anonymization criterion associated with personally identifying information being determined not to be satisfied by the personally identifying data elements; and storing, by the device, non-identifying data elements of the data to a non-identifying data store.

16. The computer-implemented method of any preceding clause, further comprising:

determining a size of the data; and in response to the size of the data to be smaller than a data size criterion, designating all of the data as comprising the personally identifying data elements.

17. The computer-implemented method of any preceding clause, further comprising:

rounding the personally identifying data elements, wherein the rounding converts the personally identifying data elements into converted non-identifying data elements; and storing the converted non-identifying data elements to the non-identifying data store.

18. The computer-implemented method of any preceding clause, further comprising:

chunking the data in a multi-dimensional space.

19. The computer-implemented method of clause 15 above with any set of combinations of the computer-implemented methods 16-18 above.

20. A non-transitory machine-readable medium, comprising executable instructions that, when executed by a processor, facilitate performance of operations, comprising:

determining personally identifying data elements of data, representative of a group of transactions, that comprise personally identifying information according to an anonymization criterion associated with personally identifying information being determined not to be satisfied by the personally identifying data elements; and storing non-identifying data elements of the data to a non-identifying data store.

21. The non-transitory machine-readable medium of any preceding clause, wherein the anonymization criterion is associated with a minimum quantity of personally identifying data elements.

22. The computer program product of any preceding clause, wherein the minimum quantity of personally identifying data elements is based on an industry type associated with the data.

23. The non-transitory machine-readable medium of clause 20 above with any set of combinations of the non-transitory machine-readable mediums of clauses 21-22 above.

What is claimed is:

1. A device, comprising:

a processor; and a memory operatively coupled to processor, the memory having stored therein computer executable components comprising:

a determination component that determines personally identifying data elements of data that comprise personally identifying information, wherein the determination component determines the personally identifying data elements based on an anonymization criterion associated with personally identifying information being determined not to be satisfied by the personally identifying data elements;

an adjustment component that converts the personally identifying data elements into non-identifying data elements, wherein the adjustment component:

identifies a first group of the personally identifying data elements that are of a first type that have enumerated values from a fixed set of enumerated values that do not meet the anonymization criterion, and for each enumerated value of the fixed set of enumerated values:

assign a distinct range of numbers to the enumerated value, for each personally identifying data element of the first group that has the enumerated value, change the enumerated value of the personally identifying data element to a unique number from the distinct range of numbers assigned to the enumerated value; and a storage component that stores the data to a non-identifying data store, wherein the data that is stored comprises the non-identifying data elements and does not comprise the personally identifying data elements.

2. The device of claim 1, wherein the anonymization criterion is associated with a data element similarity index.

3. The device of claim 1, wherein the anonymization criterion is associated with a maximum range of possible values.

4. The device of claim 1, wherein the adjustment component rounds a second group of the personally identifying data elements, wherein the second group is distinct from the first group.

5. The device of claim 4, wherein the adjustment component rounds a year of birth to a decade of birth.

6. The device of claim 4, wherein the adjustment component rounds an income amount to the nearest ten-thousand dollars.

7. The device of claim 1, wherein the determination component determines a size of the data, and in response to the size of the data to be smaller than a size criterion, determines that all of the data comprise the personally identifying data elements.

8. The device of claim 7, wherein an adjustment component adjusts the size criterion based upon a type of data element of the personally identifying data elements.

9. The device of claim 1, wherein the anonymization criterion is associated with a minimum quantity of personally identifying data elements.

10. The device of claim 9, wherein the minimum quantity of personally identifying data elements is based on an industry type associated with the data.

11. The device of claim 9, wherein the minimum quantity of personally identifying data elements is based on a level of sensitivity of the personally identifying data elements.

12. The device of claim 9, wherein the minimum quantity of personally identifying data elements is based on a level of accessibility of the personally identifying data elements.

13. The device of claim 1, wherein the adjustment component further chunks the data in a multi-dimensional space.

14. A computer-implemented method, comprising:

determining, by a device comprising a processor, personally identifying data elements of data, representative of a group of transactions, that comprise personally identifying information wherein the determining is based on an anonymization criterion associated with personally identifying information being determined not to be satisfied by the personally identifying data elements;

converting, by the device, the personally identifying data elements into non-identifying data elements, wherein the converting comprises:

identifying a first group of the personally identifying data elements that are of a first type that have enumerated values from a fixed set of enumerated values that do not meet the anonymization criterion, and for each enumerated value of the fixed set of enumerated values:

assigning a distinct range of numbers to the enumerated value, for each personally identifying data element of the first group that has the enumerated value, changing the enumerated value of the personally identifying data element to a unique number from the distinct range of numbers assigned to the enumerated value; and storing, by the device, the data to a non-identifying data store, wherein the data that is stored comprises the non-identifying data elements and does not comprise the personally identifying data elements.

15. The computer-implemented method of claim 14, further comprising:

determining a size of the data; and in response to the size of the data to be smaller than a data size criterion, designating all of the data as comprising the personally identifying data elements.

16. The computer-implemented method of claim 14, wherein the converting comprises:

rounding a second group of the personally identifying data elements, wherein the second group is distinct from the first group.

17. The computer-implemented method of claim 14, further comprising:

chunking the data in a multi-dimensional space.

18. A non-transitory machine-readable medium, comprising executable instructions that, when executed by a processor, facilitate performance of operations, comprising:

determining personally identifying data elements of data, representative of a group of transactions, that comprise personally identifying information, wherein the determining is based on an anonymization criterion associated with personally identifying information being determined not to be satisfied by the personally identifying data elements;

converting the personally identifying data elements into non-identifying data elements, wherein the converting comprises:

identifying a first group of the personally identifying data elements that are of a first type that have enumerated values from a fixed set of enumerated values that do not meet the anonymization criterion, and for each enumerated value of the fixed set of enumerated values:

assigning a distinct range of numbers to the enumerated value, for each personally identifying data element of the first group that has the enumerated value, changing the enumerated value of the personally identifying data element to a unique number from the distinct range of numbers assigned to the enumerated value; and storing the data to a non-identifying data store, wherein the data that is stored comprises the non-identifying data elements and does not comprise the personally identifying data elements.

19. The non-transitory machine-readable medium of claim 18, wherein the anonymization criterion is associated with a minimum quantity of personally identifying data elements.

20. The non-transitory machine-readable medium of claim 19, wherein the minimum quantity of personally identifying data elements is based on an industry type associated with the data.

\* \* \* \* \*